INVENTOR.
Hendrik Cornelis Anthony van Duuren
BY Brown, Jackson, Boettcher & Dienner
Att'ys.

INVENTOR.
Hendrik Cornelis Anthony van Duuren
BY Brown, Jackson, Boettcher & Dienner
Att'ys

| old | | new | |
|---|---|---|---|
| f1 | f1 | f1 | f9 |
| f1 | f2 | f1 | f10 |
| f1 | f3 | f1 | f11 |
| f1 | f4 | f1 | f12 |
| f2 | f1 | f2 | f9 |
| f2 | f2 | f2 | f10 |
| f2 | f3 | f2 | f11 |
| f2 | f4 | f2 | f12 |
| f3 | f1 | f3 | f9 |
| f3 | f2 | f3 | f10 |
| f3 | f3 | f3 | f11 |
| f3 | f4 | f3 | f12 |
| f4 | f1 | f4 | f9 |
| f4 | f2 | f4 | f10 |
| f4 | f3 | f4 | f11 |
| f4 | f4 | f4 | f12 |
| f5 | f5 | f5 | f9 |
| f5 | f6 | f5 | f10 |
| f5 | f7 | f5 | f11 |
| f5 | f8 | f5 | f12 |
| f6 | f5 | f6 | f9 |
| f6 | f6 | f6 | f10 |
| f6 | f7 | f6 | f11 |
| f6 | f8 | f6 | f12 |
| f7 | f5 | f7 | f9 |
| f7 | f6 | f7 | f10 |
| f7 | f7 | f7 | f11 |
| f7 | f8 | f7 | f12 |
| f8 | f5 | f8 | f9 |
| f8 | f6 | f8 | f10 |
| f8 | f7 | f8 | f11 |
| f8 | f8 | f8 | f12 |

FIG. 4

INVENTOR.
Hendrik Cornelis Anthony van Duuren
BY Brown, Jackson,
Boettcher & Dienner
Att'ys.

INVENTOR.
Hendrik Cornelis Anthony van Duuren
BY Brown, Jackson,
Boettcher & Dienner
Attys.

INVENTOR.
Hendrik Cornelis Anthony van Duuren
BY Brown, Jackson,
Boettcher & Dienner
Att'ys.

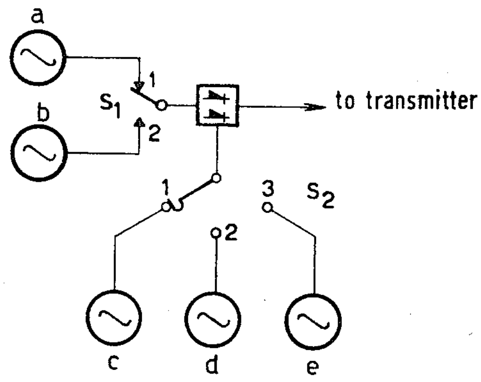
FIG. 8a
$f1 = fc - fa$
$f2 = fb - fc$
$f3 = fd - fa$
$f4 = fd - fb$
$f5 = fe - fa$
$f6 = fe - fb$
FIG. 8b
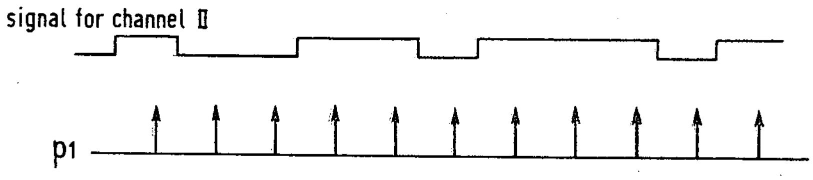
FIG. 10
INVENTOR.
Hendrik Cornelis Anthony van Duuren
BY Brown, Jackson, Boettcher & Dienner
Attys.

March 7, 1961 H. C. A. VAN DUUREN 2,974,196

METHOD AND APPARATUS FOR PREVENTING DISTORTION DURING TRANSMISSION IN TELEGRAPH SIGNALS CONSISTING OF ELEMENTS OF EQUAL DURATION

Filed Oct. 17, 1957 8 Sheets-Sheet 7

INVENTOR.

Hendrik Cornelis Anthony van Duuren

BY Brown, Jackson, Boettcher & Dienner

Att'ys.

March 7, 1961 H. C. A. VAN DUUREN 2,974,196

METHOD AND APPARATUS FOR PREVENTING DISTORTION DURING TRANSMISSION IN TELEGRAPH SIGNALS CONSISTING OF ELEMENTS OF EQUAL DURATION

Filed Oct. 17, 1957 8 Sheets-Sheet 8

INVENTOR.

Hendrik Cornelis Anthony van Duuren

BY Brown, Jackson, Boettcher & Dienner

Attys.

United States Patent Office 2,974,196
Patented Mar. 7, 1961

2,974,196

METHOD AND APPARATUS FOR PREVENTING DISTORTION DURING TRANSMISSION IN TELEGRAPH SIGNALS CONSISTING OF ELEMENTS OF EQUAL DURATION

Hendrik Cornelis Anthony van Duuren, Wassenaar, Netherlands, assignor to De Staat der Nederlanden, ten Deze Vertigenwoordigd Door de Directeur-Generaal der Posterijen, Telegrafie en Telefonie, The Hague, Netherlands

Filed Oct. 17, 1957, Ser. No. 690,706

Claims priority, application Netherlands Oct. 20, 1956

16 Claims. (Cl. 178—50)

The invention relates to a method and apparatus for preventing distortion during transmission in telegraph signals. Distortion may occur in the case of transmission via a radio channel as well as in the case of transmission by cable. One of the causes of distortion is signal element prolongation.

A method and apparatus of this type are known from the U.S. patent application Serial No. 339,702 which was filed by applicant on March 2, 1953, and which issued November 3, 1959, as Patent No. 2,911,473.

In the example described in that patent traffic originating from eight subscribers is handled by means of a time division process in the same time as normally required for traffic from one subscriber. First a common channel is formed in which the signals are conveyed by means of marking elements and spacing elements. The marking elements may be transmitted by one frequency and the spacing elements by another frequency. By means of the apparatus shown in the said application and by the use of more frequencies, sub-channels may be formed.

In the frequency band thus occupied a first element is transmitted at a frequency of one sub-channel, after which the next element is transmitted at a frequency of another channel, etc. The frequencies of each sub-channel are taken up at the receiving end by a receiver selective for those frequencies.

This system might also be used for transmitting traffic from one subscriber at an eight times higher telegraphic speed.

An inconvenience of the said method consists in that if two sub-channels are formed the bandwidth occupied is doubled, in the case of three sub-channels it is trebled, etc. By the method according to the invention the bandwidth occupied is considerably reduced.

The invention mainly deals with transmission methods in which transmission takes place via several channels simultaneously. However, the method might also be applied to the transmission via a single channel, but the method becomes only attractive in the case of transmission via several channels.

The total of the elements occurring at a certain moment in the several channels is transmitted by means of one frequency, which is characteristic for the element combination presented at that moment by the said channels collectively.

This transmission method requires a number of frequencies which is logically related with the number of channels to be transmitted simultaneously. It is a well-known fact that the simultaneous transmission of $n$ channels requires $2^n$ frequencies.

According to the invention sub-channels are formed by means of these frequencies.

According to the invention the number of sub-channels is enlarged with an additional sub-channel or auxiliary channel. If without further measures the occurrence of two successive element combinations from the collective channels would cause frequencies of one sub-channel to follow each other immediately, according to the invention the second element combination is transmitted by means of a frequency of the auxiliary channel. So if there occurs a frequency of the auxiliary channel, this frequency represents another frequency, belonging to the sub-channel to which belonged the frequency immediately preceding it. In the case of the transmission of signals representative of the simultaneous elements of two channels, each sub-channel contains two frequencies. In the case of the transmission of signals representative of the simultaneous elements in three channels each sub-channel contains four frequencies. In the case of the transmission of signals representative of the simultaneous elements in $n$ channels each sub-channel contains $$\frac{2^n}{2}$$

frequencies. According to the invention a further reduction of the bandwidth occupied is obtained by a further enlargement of the number of sub-channels and by using only two frequencies for each sub-channel, so the auxiliary channel too has only two frequencies.

For each sub-channel formed there is at the receiving end a selective receiver.

Further, according to the invention it is possible to use only one frequency in the auxiliary channel. This frequency is transmitted, if the combination of the signal elements of the original channels would cause the consecutive transmission of different frequencies of the same sub-channel. In that case the unique frequency of the auxiliary channel is sent instead of the second frequency. If the combination of channels causes the consecutive transmission of twice the same frequency, this transmission is effected as such. This offers no direct inconvenience in connection with element prolongation.

Further, according to the invention, it is still possible to provide only one frequency for each channel, a separate selective receiver being provided for each frequency.

According to the invention measures are already taken at the transmitting end in order that two successive elements are always placed in different sub-channels, and, consequently, at the receiving end terminate in different receivers. From the Netherlands patent application No. 206,628 a method is known in which measures are taken only at the receiving end to lead two successive elements to different receivers.

The invention will now be explained with the aid of a number of figures.

Fig. 1 concerns the simultaneous transmission via two channels; it shows for some cases how transmission takes place, without and with an auxiliary channel.

Fig. 2 shows for a number of cases, how transmission takes place without and with an auxiliary channel.

Fig. 3 concerns the simultaneous transmission via three channels.

Fig. 4 shows for a number of cases, how transmission takes place without and with an auxiliary channel according to the system of Fig. 3.

Figure 6:
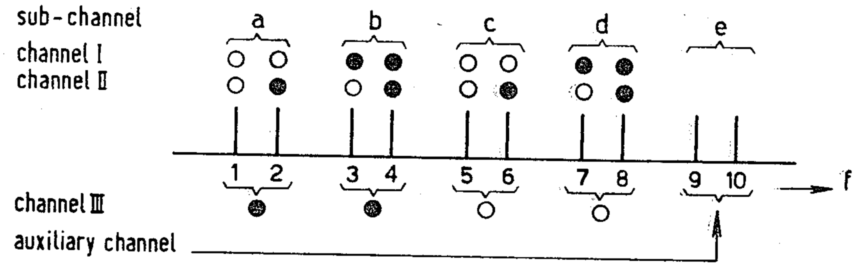

Fig. 6 concerns the simultaneous transmission via three channels and the forming of four sub-channels and an auxiliary channel.

Figure 7:
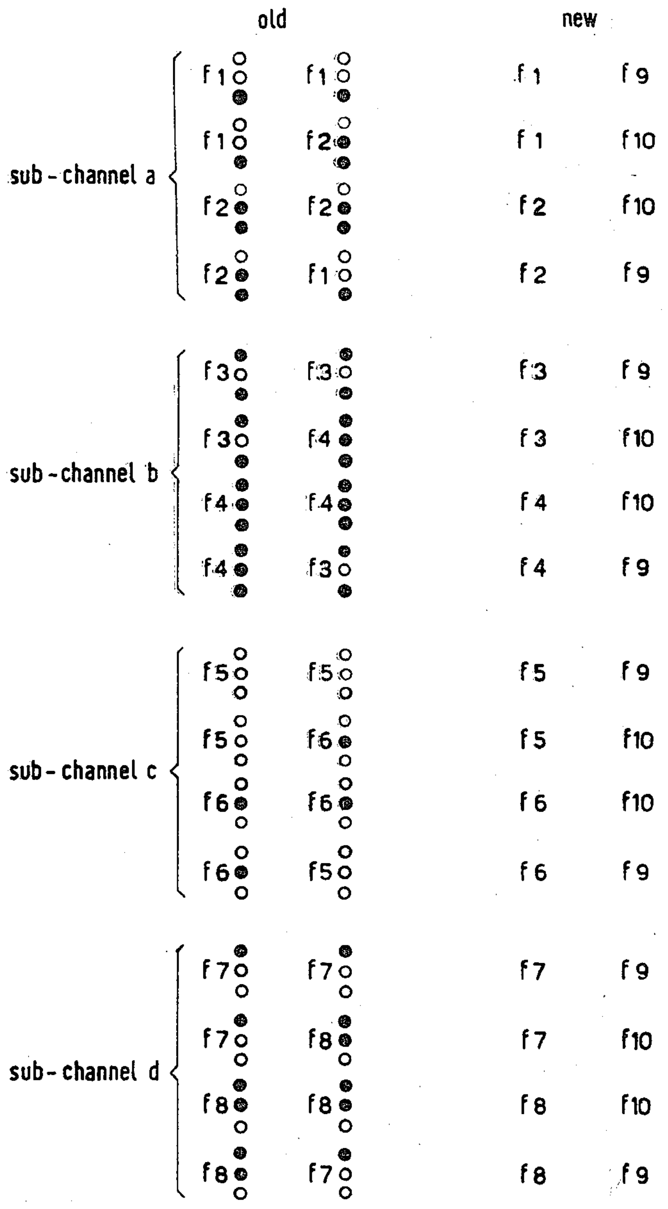

Fig. 7 shows how transmission takes place without and with an auxiliary channel according to the system of Fig. 6.

Fig. 8$a$ gives a block diagram of a transmitter designed to realize the purpose aimed at according to the invention, and Figure 8*b* gives a table useful in explaining the operation of the block diagram of Figure 8*a*.

Figure 9:
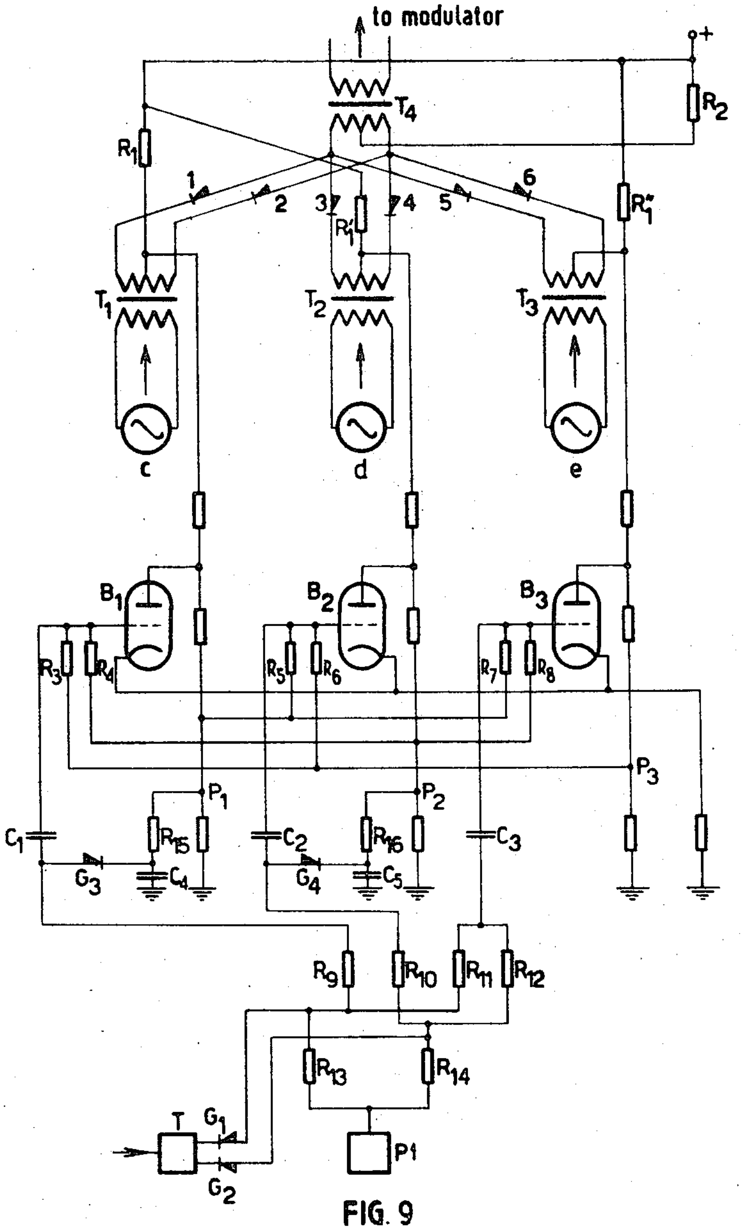

Fig. 9 gives a further development of Fig. 8*a* in a wiring diagram.

Fig. 10 gives a time diagram illustrating the working of the apparatus according to Fig. 9.

Figure 11:
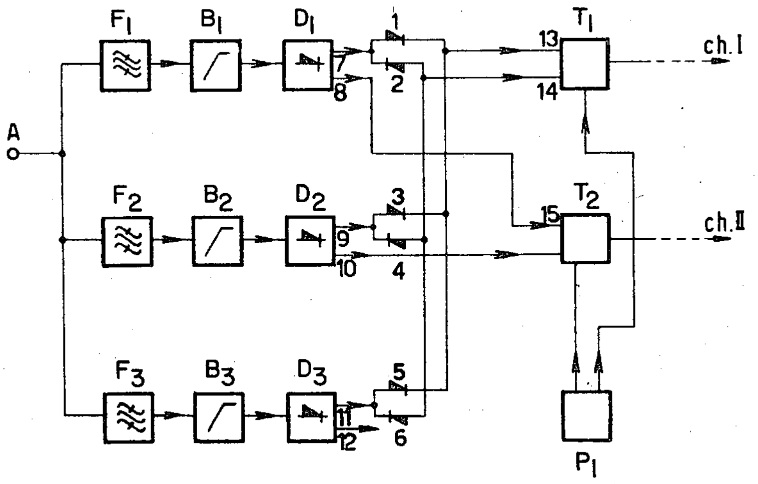

Fig. 11 gives a block diagram of a receiver according to the invention.

First an example of the transmission of signals representative of the simultaneous elements in two channels will be set forth.

Figure 1:
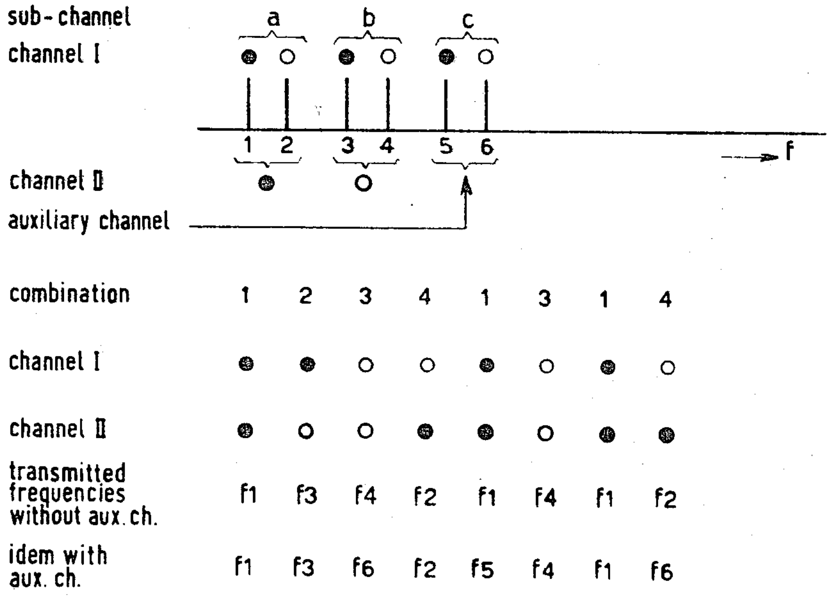

Each channel may contain traffic from one subscriber or traffic from a number of subscribers combined by the time division principle. If there appear simultaneously a marking element in channel I and a marking element in channel II, a frequency *f*1 is transmitted (see the table of Fig. 1, combination 1). A marking element is denoted by a black circle, a spacing element by a blank one. If there appear simultaneously a marking element in channel I and a spacing element in channel II a frequency *f*3 is transmitted (Fig. 1, combination 2). If there appear simultaneously a spacing element in channel I and a spacing element in channel II, a frequency *f*4 is transmitted (Fig. 1, combination 3). If there appear simultaneously a spacing element in channel I and a marking element in channel II, a frequency *f*2 is transmitted (Fig. 1, combination 4). The above is supposed to be well-known.

According to the invention two sub-channels are formed, frequencies *f*1 and *f*2 being assigned to a first sub-channel: sub-channel *a*, and the frequencies *f*3 and *f*4 being assigned to a second sub-channel: sub-channel *b*. For each sub-channel there is at the receiving end a selective receiver and associated set of equipment for coupling the elements represented by the signals in its associated subchannel to the assigned one of the channels I and II. Since frequencies *f*3 and *f*4 are transmitted over the same subchannel, if the element combination 2 (frequency *f*3) is immediately followed by the element combination 3 (frequency *f*4) two frequencies will reach the same receiver one immediately after the other at the receiving end.

In the case of element prolongation this may lead to mistakes. The mistakes that may occur are deemed sufficiently known; relevant data are given by way of example in the said Netherlands patent application No. 206,628.

According to the invention the element combination 3 is transmitted by means of a frequency *f*6 of the additional sub-channel or auxiliary channel *c*. For this sub-channel too a selective receiver has been provided at the receiving end. Thus according to the invention two successive elements are transmitted via different channels and received in separate receivers. In this way element prolongations are for the greater part rendered harmless.

According to the invention further steps are taken as follows: If element combination 4 (*f*2) is followed by element combination 1 (normally transmitted by means of *f*1) combination 4 is transmitted by means of frequency *f*2 and combination 1 by means of frequency *f*5. If element combination 1 (*f*1) is followed by element combination 4 (normally transmitted by means of *f*2), combination 1 is transmitted by means of frequency *f*1 and combination 4 by means of frequency *f*6. If element combination 1 (*f*1) is followed by a similar combination (element combination), frequency *f*1 is followed by frequency *f*5.

If element combination 4 (*f*2) is followed by a similar combination, frequency *f*2 is followed by frequency *f*6.

If element combination 2 (*f*3) is followed by combination 3 (*f*4), frequency *f*3 is followed by frequency *f*6, as has been described already. If element combination 3 (*f*4) is followed by combination 2 (*f*3), frequency *f*4 is followed by frequency *f*5.

If element combination 2 (*f*3) is followed by a similar combination, frequency *f*3 is followed by frequency *f*5.

If element combination 3 (*f*4) is followed by a similar combination, frequency *f*4 is followed by frequency *f*6.

Figure 2:
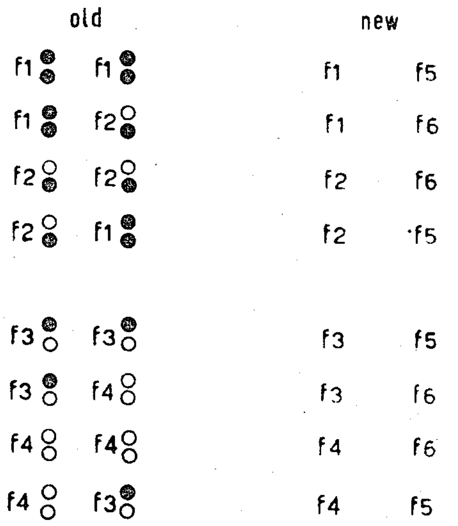

The foregoing signal transmissions have been tabulated in Fig. 2.

It results from the above that neither the occurrence of *f*5 nor the occurrence of *f*6 (frequencies of the auxiliary channel) have fixed meanings for channel II.

For channel I frequencies *f*5 and *f*6 represent respectively a marking element and a spacing element.

For channel II frequency *f*5 or frequency *f*6 represents a marking element, if it is preceded by a frequency of sub-channel *a* and a spacing element, if it is preceded by a frequency of sub-channel *b*. The meaning of *f*5 or *f*6 may also be indicated as follows: Whenever the frequency *f*5 or *f*6 appears, it represents a frequency of the sub-channel of which occurred a frequency immediately before. If *f*5 appears after *f*1 (in sub-channel *a*) or after *f*3 (in sub-channel *b*), or if *f*6 appears after *f*2 or atfer *f*4, this means that the element combination is the same as the one immediately preceding. If *f*5 appears after *f*2 (in sub-channel *a*) or after *f*4 (in sub-channel *b*), or if *f*6 appears after *f*1 or *f*3, this means that the element combination is different from the one immediately preceding in the relevant sub-channel.

The invention will be explained by means of an example, in which three channels are used simultaneously.

Figure 3:
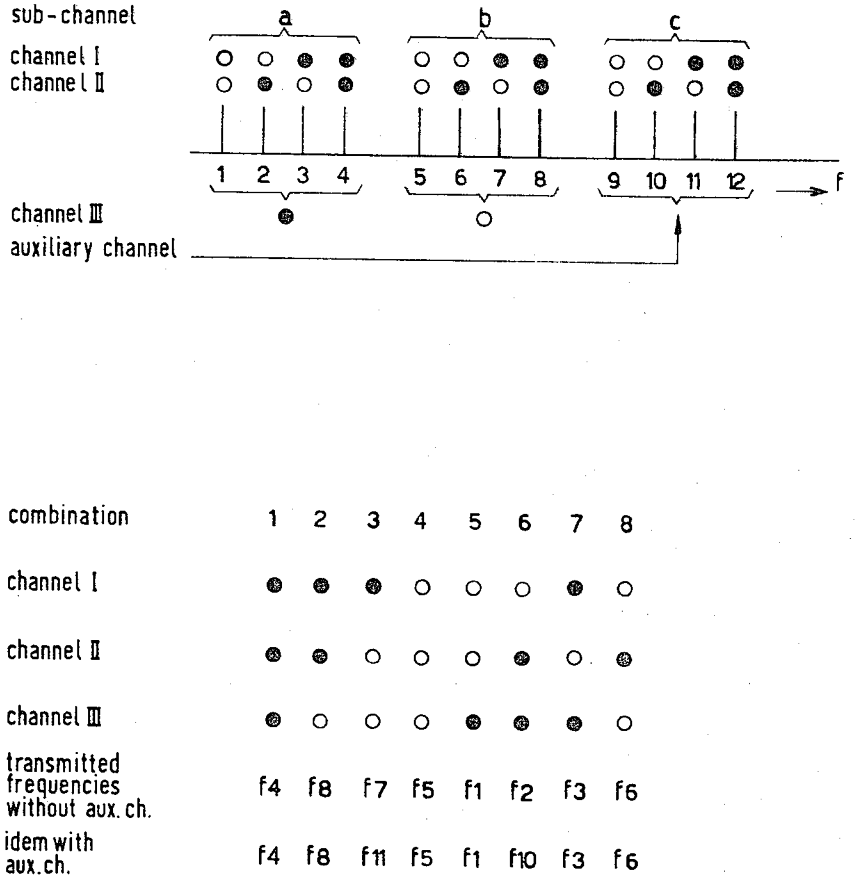

If there appears a marking element in channel I together with a marking element in channel II and a marking element in channel III, a frequency *f*4 is transmitted (see the table of Fig. 3, combination 1).

If there appears a marking element in channel I, together with a marking element in channel II and a spacing element in channel III, a frequency *f*8 is transmitted (Fig. 3, combination 2).

If there appears a marking element in channel I, together with a spacing element in channel II and a spacing element in channel III, a frequency *f*7 is transmitted (Fig. 3, combination 3).

If there appears a spacing element in channel I, together with a spacing element in channel II and a spacing element in channel III, a frequency *f*5 is transmitted (Fig. 3 combination 4).

If there appears a spacing element in channel I, together with a spacing element in channel II and a marking element in channel III, a frequency *f*1 is transmitted (Fig. 3, combination 5).

If there appears a spacing element in channel I, together with a marking element in channel II and a marking element in channel III, a frequency *f*2 is transmitted (Fig. 3, combination 6).

If there appears a marking element in channel I, together with a spacing element in channel II and a marking element in channel III, a frequency *f*3 is transmitted (Fig. 3, combination 7).

If there appears a spacing element in channel I, together with a marking element in channel II and a spacing element in channel III, a frequency *f*6 is transmitted (Fig. 3, combination 8).

The above is supposed to be well-known.

According to the invention two sub-channels are formed, the frequencies *f*1, *f*2, *f*3 and *f*4 being assigned to a first sub-channel, sub-channel *a*, and the frequencies *f*5, *f*6, *f*7 and *f*8 being assigned to a second sub-channel, sub-channel *b*. For each sub-channel there is at the receiving end a selective receiver. In this case too it is possible that two frequencies of one and the same sub-channel follow each other, which is undesirable.

According to the invention an additional sub-channel or auxiliary channel is formed of frequencies *f*9, *f*10, *f*11 and *f*12. For this sub-channel too a selective receiver has been provided at the receiving end. The occurrence of a frequency of this auxiliary channel means that the element originating from channel III is of the same nature (mark or space) as the preceding element. If element combination 5 (*f*1) is followed by element combination 6 (normally transmitted by means of *f*2), according to the invention, combination 5 is transmitted by means of frequency $f1$ and combination 6 by means of frequency $f10$.

If element combination 5 ($f1$) is followed by element combination 7 (normally transmitted by means of $f3$), according to the invention combination 5 is transmitted by means of frequency $f1$ and combination 7 by means of frequency $f11$.

The above-mentioned and other combination possibilities are tabulated in Fig. 4, which will be self-evident after what has been said about Fig. 2.

In this case too it is seen that the occurrence of one of the frequencies of the auxiliary channel (sub-channel *c*) has no fixed meaning for channel III.

Figure 5:
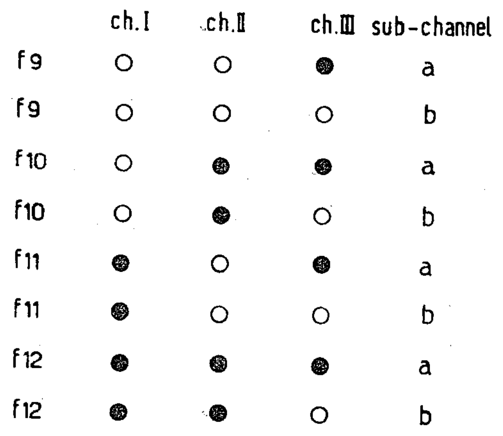
Fig. 5 illustrates the meanings of the frequencies of the auxiliary channel in relation to the various sub-channels.

For channel I frequency $f9$ or $f10$ represents a spacing element (Fig. 5); frequency $f11$ or $f12$ in this channel represents a marking element.

For channel II frequency $f9$ or $f11$ represents a spacing element; $f10$ or $f12$ in this channel represents a marking element. For channel III $f9$ or $f10$ or $f11$ or $f12$ represents a marking element, if it is preceded by a frequency of sub-channel *a*, and a spacing element, if it is preceded by a frequency of sub-channel *b*.

It is seen from Fig. 1 and Fig. 3 that the bandwidth occupied for the transmission method according to the invention is one and a half times as large as is used in the known method.

With the method according to the U.S. patent No. 2,911,473, the bandwidth occupied is at least twice as large.

According to the invention a further reduction of the extra bandwidth may be achieved by providing only two frequencies for each sub-channel; in that case the auxiliary channel too needs only to contain two frequencies.

In the example according to Fig. 3 the frequencies $f1$ to $f8$ must be divided among four sub-channels, and an additional channel (the auxiliary channel) may be formed of two frequencies (see Fig. 6.). In the arrangement according to Fig. 6 frequencies $f1$ and $f2$ are used for sub-channel *a*, frequencies $f3$ and $f4$ for sub-channel *b*, frequencies $f5$ and $f6$ for sub-channel *c*, frequencies $f7$ and $f8$ for sub-channel *d*, the auxiliary channel being formed by frequencies $f9$ and $f10$.

The meaning of frequencies $f9$ and $f10$ in relation to the sub-channels is as follows:

If $f9$ appears after $f1$, $f3$, $f5$ *or* $f7$, or if $f10$ appears after $f2$, $f4$, $f6$ or $f8$, the element combination is the same as the one immediately preceding in the relevant sub-channel. If $f9$, appears after $f2$, $f4$, $f6$ or $f8$, or if $f10$ appears after $f1$, $f3$, $f5$ or $f7$, the element combination is different from the one immediately preceding in the relevant sub-channel.

By this method the bandwidth occupied is still considerably reduced as compared with the bandwidth required in the method according to the U.S. Patent No. 2,911,473 and it yields also a reduction of bandwidth with respect to the method according to Fig. 3 of the present application.

The meaning of frequencies $f9$ and $f10$ in relation to channels I, II and III is a follows (see Fig. 7):

For channel II frequency $f9$ represents a spacing element (irrespective of the nature of the preceding element in channel II).

For channel I, as well as for channel III, the appearance of frequency $f9$ means that the nature of the element is the same as that of the preceding element of the relevant channel.

For channel II frequency $f10$ represents a marking element (irrespective of the nature of the preceding element in channel II).

For channel I, as well for channel III the appearance of frequency $f10$ means that the nature of the element is the same as that of the preceding element of the relevant channel.

*The transmitter*

Figures 8 and 9 show a transmitter designed to implement the method indicated in Fig. 1, in which transmission takes place via two channels simultaneously.

The principle of the transmitter is shown in Fig. 8*a*. Letters *a* to *e* designate five generators, which deliver five frequencies, $f_a$ to $f_e$. $S_1$ and $S_2$ are switches.

It is assumed that the channels I and II, which are to be worked simultaneously, are synchronized. Switches $S_1$ and $S_2$ are then actuated simultaneously. Switch $S_1$ is actuated by channel I. If there appears in channel I a marking element, switch $S_1$ will be in position 1 and if there appears a spacing element, switch $S_1$ will be in position 2. Switch $S_2$ is actuated by channel II.

If there appears in channel II a marking element, switch $S_2$ will be normally in position 1 and if there appears a spacing element, switch $S_2$ will be normally in position 2.

If, however, in channel II two marking elements follow each other immediately, switch $S_2$ will be in position 1 during the first marking element and in position 3 during the second marking element. And if in channel II two spacing elements follow each other immediately, switch $S_2$ will be in position 2 during the first spacing element and in position 3 during the second spacing element. The central contacts of both switches $S_1$ and $S_2$ are connected to a modulator, which is connected to a transmitter. There arrive always two frequencies at the modulator.

The frequency the modulator delivers to the transmitter depends on the combination of frequencies applied to the modulator at a certain moment. The specific frequency which is delivered to the transmitter for each combination of two of the frequencies $f_a$–$f_e$ applied to the modulator is shown in Figure 8*b*. Specifically, if $f_a$ and $f_c$ occur simultaneously, a frequency $f1$ is delivered to the transmitter.

If $f_b$ and $f_c$ occur simultaneously, a frequency $f2$ is delivered to the transmitter.

If $f_a$ and $f_d$ occur simultaneously, a frequency $f3$ is deliverd to the transmitter.

If $f_b$ and $f_d$ occur simultaneously, a frequency $f4$ is delivered to the transmitter.

If $f_a$ and $f_e$ occur simultaneously, a frequency $f5$ is delivered to the transmitter.

If $f_b$ and $f_e$ are delivered simultaneously, a frequency $f6$ is delivered to the transmitter.

In Fig. 8*a* the switches $S_1$ and $S_2$ are shown at mechanical switches. The symbols used may just as well represent electronic switches, however.

Fig. 9 exemplifies the way in which the switch $S_2$ of Fig. 8*a* may be realized. The generators *c*, *d* and *e* in Fig. 9 correspond to the similarly lettered generators in Fig. 8*a*. The three tubes $B_1$, $B_2$ and $B_3$ constitute a trigger circuit. The anode of each tube is connected via a potentiometer and series resistors to the grids of the two other tubes. If one of the tubes becomes conductive, its anode potential falls. The grid potentials of the two other tubes experience a consequent fall and these tubes become non-conductive. In any case one of the tubes is conductive, the two others being non-conductive. If tube $B_1$ is conductive, a plate current flows from +battery via $R_1$ to the anode of tube $B_1$. This gives rise to a potential difference across the rectifiers 1 and 2. These rectifiers become conductive and a voltage of frequency $f_c$ is led from generator *c* via transformers $T_1$ and $T_4$ to the modulator. The rectifiers 1 and 2 become conducting as a result of a voltage drop developing across resistor $R_1$, through which flows the plate current of tube $B_1$, which is conductive. The tubes $B_2$ and $B_3$ are non-conductive and consequently there is no voltage drop across resistors $R_1'$ and $R_1''$. Thus the potential at one end of rectifiers 1 and 2 remains equal to the battery voltage, whereas the potential at the other end of these rectifiers falls, so that rectifiers 1 and 2 become conductive. The rectifiers 3 and 4 are non-conductive, because there is no potential difference across resistor $R_1'$. The rectifiers 5 and 6 are non-conductive, because there is no potential difference across resistor $R_1''$. Moerover these rectifiers are locked in the blocking condition by a small potential drop across $R_2$, through which flows the current for rectifiers 1 and 2.

If tube $B_2$ is conductive, a plate current flows from +battery via $R_1'$ to the anode of tube $B_2$. This gives rise to a potential difference across the rectifiers 3 and 4, so that these rectifiers become conductive, and a voltage of frequency $f_d$ is led from generator *d* via transformers $T_2$ and $T_4$ to the modulator. The rectifiers 3 and 4 become conductive as a result of a potential difference developing across $R_1'$. The rectifiers 1, 2, 5 and 6 are then non-conductive. If tube $B_3$ is conductive, a plate current flows from +battery via resistor $R_1''$ to the anode of tube $B_3$. This gives rise to a potential difference across the rectifiers 5 and 6, so that these rectifiers become conductive and a voltage of frequency $f_e$ is led from generator *e* via transformers $T_3$ and $T_4$ to the modulator.

$P_1$ is an impulse generator, which delivers at fixed intervals a positive impulse to the common point of resistors $R_{13}$ and $R_{14}$. T is a trigger, at the input terminal of which arrive the intelligence elements of the signals from channel II.

If there arrives a marking element output terminal 1 will be positive and output terminal 2 negative. If there arrives a spacing element output terminal 1 will be negative and output terminal 2 positive. If there appears a positive impulse from $P_1$ and trigger T is in the marking condition, the positive pulse from $P_1$ is diverted via $R_{14}$ and rectifier $G_2$, since in the marking condition output terminal 2 of trigger T is negative.

Conequently, the impulse from $P_1$ cannot pass via $R_{10}$ to the grid of tube $B_2$ or via $R_{12}$ to the grid of tube $B_3$.

This impulse from $P_1$ will now be led via $R_{13}$ to the lower end of $R_9$ and as terminal 1 of trigger T is positive, $G_1$ will be non-conductive. Thus the pulse is led to the grid of tube $B_1$, which becomes conductive.

Consequently, a voltage of frequency $f_c$ passes from generator *c* to the modulator. The positive pulse finds also a path via $R_{13}$ and $R_{11}$ to the grid of tube $B_3$, but in this path $R_{11}$ and $R_{12}$ constitute a potentiometer, so that the potential on the grid of $B_3$ will be much lower than the potential on the grid of $B_1$, so that $B_1$ becomes conductive and not $B_3$.

If a positive impulse from $P_1$ appears, when trigger T is in the spacing condition, the positive impulse from $P_1$ will be diverted via resistor $R_{13}$ and rectifier $G_1$, since in the spacing condition the output terminal 1 of trigger T is negative.

Consequently, the impulse cannot pass via $R_9$ to the grid of $B_1$ or via $R_{11}$ to the grid of $B_3$. The pulse will now be led via $R_{14}$ to the lower end of $R_{10}$ and as terminal 2 of trigger T is positive, rectifier $G_2$ will be non-conductive. Thus the impulse is led to the grid of tube $B_2$, which becomes conductive. Consequently, a voltage of frequency $f_d$ passes from generator *d* to the modulator. The positive pulse finds also a path via $R_{14}$ and $R_{12}$ to the grid of tube $B_3$, but in this path $R_{11}$ and $R_{12}$ constitute a potentiometer, so that the potential on the grid of tube $B_3$ will be much lower han the one on the grid of tube $B_2$, so that tube $B_2$ becomes conductive and not $B_3$. If there appears a marking element in channel II, the positive impulse passes, as has been mentioned, to the grid of tube $B_1$ (and $B_1$ becomes conductive). This impulse can reach the grid of tube $B_1$, because rectifier $G_3$ was in the blocking condition, $B_1$ being non-conductive, so that the right-hand terminal of $G_3$ had a positive potential. If a marking element has appeared, $B_1$ becomes conductive and the potential of the right-hand terminal of $G_3$ falls. If there appears again a marking element in channel II, the corresponding pulse from $P_1$ will no longer have access to the grid of tube $B_1$, but be diverted via $G_3$.

The impulse from $P_1$ will now find a path via $R_{13}$ and $R_{11}$ to the grid of tube $B_3$, which becomes conductive. Consequently, a voltage of frequency $f_e$ passes from generator *e* to the modulator. If there appears a spacing element in channel II, the positive impulse from $P_1$ passes, as has been mentioned, to the grid of $B_2$ (and $B_2$ becomes conductive). This impulse can reach the grid of tube $B_2$, because rectifier $G_4$ was in the blocking condition, $B_2$ being non-conductive, so that the right-hand terminal of $G_4$ had a positive potential.

If a spacing element has appeared, $B_2$ becomes conductive and the potential of the right-hand terminal of $G_4$ falls. If there appears again a spacing element in channel II, the corresponding pulse from $P_1$ will no longer have access to the grid of tube $B_2$, but will be diverted via $G_4$.

The impulse from $P_1$ will now find a path via $R_{14}$ and $R_{12}$ to the grid of $B_3$, which becomes conductive. Consequently, a voltage of frequency $f_e$ passes from generator *e* to the modulator.

In this way the result is secured that, if in channel II two similar elements follow each other immediately, the second element is transmitted by the additional sub-channel or auxiliary channel. When the said second similar element appears, tube $B_3$ has become conductive and tubes $B_1$ and $B_2$ have become non-conductive. If a third similar element follows, the corresponding impulse from impulse generator $P_1$ can again reach the grid of tube $B_1$ or of tube $B_2$ (depending on the polarity of the element) and render this tube conductive.

To ensure a good working of the arrangement the value of resistors $R_3$ to $R_8$ has been taken rather large, the value of resistors $R_9$ to $R_{12}$ has been taken 10 to 20 times smaller than the value of $R_3$ to $R_8$ and the value of resistors $R_{13}$ and $R_{14}$ has been taken again 10 times smaller than the value of $R_9$ to $R_{12}$.

Further the time constant of capacitors $C_1$, $C_2$ and $C_3$ in combination with resistors $R_3$, $R_4$, resp. $R_5$, $R_6$, resp. $R_7$, $R_8$ has been made two or three times as large as the duration of the impulse of impulse generator $P_1$, but much smaller than the period of $P_1$. The time constants of $C_4$ $R_{15}$ and $C_5$ $R_{16}$ are only a little smaller than the period of $P_1$.

Fig. 10 shows on line 1, plotted against the time, a message as transmitted e.g. via channel II.

Line 2 shows as a function of time of the voltage appearing at the output terminal of the impulse generator $P_1$.

*The receiver*

Fig. 11 shows a receiver designed to implement the method as indicated in Fig. 1. By this method two channels are transmitted simultaneously.

At point A frequencies *f*1 to *f*6 arrive in an arbitrary order of sequence.

$F_1$ is a filter passing frequencies *f*1 and *f*2.

$F_2$ is a filter passing frequencies *f*3 and *f*4.

$F_3$ is a filter passing frequencies *f*5 and *f*6.

Each filter is followed by a limiter, designated by $B_1$, $B_2$ and $B_3$, respectively.

Behind each limiter a discriminator-detector has been provided, designated respectively by $D_1$, $D_2$ and $D_3$.

Each discriminator-detector has two output terminals. Output terminal 7 of $D_1$ is positive if frequency *f*1 appears and negative if frequency *f*2 appears.

Output terminal 8 of $D_1$ is positive, if either frequency *f*1 or frequency *f*2 occurs.

Output terminal 9 of $D_2$ is positive, if frequency *f*3 appears and negative, if frequency *f*4 appears.

Output terminal 10 of $D_2$ is positive, if either frequency *f*3 or frequency *f*4 appears.

Output terminal 11 of $D_3$ is positive, if frequency *f*5 appears and negative, if frequency *f*6 appears.

Output terminal 12 of $D_3$ is positive, if either frequency $f5$ or frequency $f6$ appears.

The output terminals 7, 9 and 11 of $D_1$, $D_2$ and $D_3$, respectively, are connected by means of rectifiers 1 to 6 to the two input terminals of a trigger, $T_1$, which provides channel I with the information destined for this channel.

If the output terminal 7, 9 or 11 is positive, this means for channel I a marking element, since these output terminals become positive on arrival of frequency $f1$, $f3$ or $f5$, respectively, which represent for channel I a marking element (cf. Fig. 1). The positive potential of terminal 7, 9 or 11 is passed via rectifier 1, 3 or 5, respectively, to the first input terminal (13) of trigger $T_1$, which assumes the marking condition in consequence and delivers a marking element to channel I.

If the output terminal 7, 9 or 11 is negative, a spacing element is coupled to channel I, since these output terminals become negative on arrival of frequency $f2$, $f4$ or $f6$, respectively, which represent for channel I a spacing element (cf. Fig. 1).

The negative potential of terminal 7, 9 or 11 is passed via rectifier 2, 4 or 6, respectively, to the second input terminal (14) of trigger $T_1$, which assumes the spacing condition in consequence and delivers a spacing element to channel I at a moment determined by the impulse generator $P_1$, which delivers scanning impulses at fixed intervals. This impulse generator $P_1$ is synchronised. Trigger $T_2$ provides channel II with the information destined for this channel.

If output terminal 8 of the discriminator-detector is positive, a marking element is coupled to channel II, since this terminal becomes positive on arrival of frequency $f1$ or $f2$, which represent for channel II a marking element (cf. Fig. 1). This positive potential at point 8 is passed to the first input terminal 15 of trigger $T_2$, which assumes the marking condition in consequence and delivers a marking element to channel II.

If output terminal 10 of the discriminator-detector $D_2$ is negative, this means for channel II a spacing element, since this output terminal becomes negative on arrival of frequency $f3$ or $f4$, which represent for channel II a spacing element (cf. Fig. 1). This negative potential at point 10 is passed to the second input terminal 17 of trigger $T_2$, which assumes the spacing condition in consequence and delivers a spacing element to channel II at a moment determined by the impulse generator $P_1$.

If, due to the occurrence of $f1$ or $f2$, $T_2$ has assumed the marking condition, a marking element is delivered to channel II. If immediately afterwards frequency $f5$ or $f6$ occurs, this means another marking element for channel II. Trigger $T_2$ is bi-stable, so it is still in the marking condition. When the scanning pulse from $P_1$ appears, another marking element is delivered to channel II.

If due to the occurrence of $f3$ or $f4$ trigger $T_2$ has assumed the spacing condition, a spacing element is delivered to channel II. If immediately afterwards frequency $f5$ or $f6$ occurs, a spacing element will appear in channel II. Trigger $T_2$ is still in the spacing condition and as the scanning pulse from $P_1$ appears, another spacing element is delivered to channel II. To make sure that indeed $f5$ or $f6$ has followed either $f1$ or $f2$, or $f3$ or $f4$, the positive potential occurring on arrival of $f5$ or $f6$ at point 12 of the discriminator-detector $D_3$ may be utilized. To give the receiver in channel II certainty that a fresh element has arrived, and that there is no question of a prolongation of the preceding impulse, the potential occurring at terminal 12 may thus be utilized.

While I have illustrated and described what I regard to be the preferred embodiment of my invention, nevertheless it will be understood that such is merely exemplary and that numerous modifications and rearrangements may be made therein without departing from the essence of the invention, I claim:

1. In a multiplex telegraph system: signal generator means for generating a single frequency signal which represents the marking and spacing elements which simultaneously occur in a plurality of different channels, different frequency signals being assigned to represent different combinations of said marking and spacing elements, and in which different sets of said frequency signals are assigned to different primary subchannels: auxiliary signal generator means coupled to said signal generator means, including frequency generator means operative to generate a different set of frequency signals for transmission over an auxiliary subchannel, and means for enabling said frequency generator means responsive to the occurrence of consecutive element combinations which require the transmission of consecutive frequency signals over the same subchannel; and receiver means for receiving said different frequency signals, including discriminator means for converting said different frequency signals into output signals, means for decoding said output signals into signals representative of the marking and spacing elements represented by the incoming signal, and means for selectively coupling said output signals assigned to different ones of the primary and auxiliary subchannels to said decoding means, whereby successive signals are consistently transmitted over different ones of said selective coupling means.

2. In a multiplex telegraph system: signal generator means for generating a single frequency signal which represents the marking and spacing elements which simultaneously occur in each of two different channels, four different frequency signals being assigned to represent the different combinations of said marking and spacing elements in said two channels, and in which different pairs of said frequency signals are assigned for transmission over two different primary subchannels; auxiliary generator means coupled to said signal generator means including frequency generator means operative to generate a first and a second auxiliary frequency signal for transmission over an auxiliary subchannel, and means for enabling said frequency generator means responsive to the occurrence of consecutive element combinations which require the transmission of consecutive frequency signals over the same one of said primary subchannels, different ones of the auxiliary frequency signals being transmitted with the occurrence of different ones of the element combinations; and receiver means for receiving said six frequency signals, including discriminator means for converting said six frequency signals into output signals, means for decoding said output signals into signals representative of the marking and spacing elements represented by the incoming signal, and means for selectively coupling the output signals representing different pairs of frequency signals which are assigned to the primary and auxiliary subchannels to said decoding means, whereby successive signals are consistently transmitted over different ones of said selective coupling means.

3. In a multiplex telegraph system: signal generator means for generating a single frequency signal which represents the marking and spacing elements which simultaneously occur in a plurality of different channels, different frequency signals being assigned to represent different combinations of said marking and spacing elements, different sets of said frequency signals being assigned to different subchannels; and auxiliary generator means coupled to said signal generator means including frequency generator means operative to control the generation of a different preassigned frequency signal for transmission over an auxiliary subchannel in lieu of the assigned signal over the assigned subchannel, and means for enabling said frequency generator means in response to the occurrence of element combinations which require the transmission of consecutive frequency signals over the same subchannel to thereby minimize the error due to element prolongation in the subchannels.

4. In a multiplex telegraph system in which the marking and spacing elements which occur simultaneously in a plurality of different channels are represented by a single frequency signal, different frequency signals being assigned to represent different combinations of said marking and spacing elements, and in which different sets of said frequency signals are assigned to different primary subchannels; auxiliary signal generator means operative to control generation of auxiliary frequency signals for an auxiliary subchannel to minimize the error due to element prolongation in a subchannel when ever consecutive frequency signals are to be transmitted over the same primary subchannel including frequency generator means, signal detector means for providing a control signal indicating the occurrence of consecutive ones of said combinations for transmission over the same primary subchannel, and means for coupling said control signal to said frequency generator means to effect the transmission of an auxiliary signal over said auxiliary subchannel in lieu of the signal transmission over its normal subchannel.

5. In a multiplex telegraph system which includes signal generator means for generating a single frequency signal which represents the marking and spacing elements which occur simultaneously in a plurality of different channels, different frequency signals being generated to represent different combinations of said marking and spacing elements, and in which different sets of said frequency signals are assigned to different primary subchannels; auxiliary signal generator means coupled to said signal generator means and operative to control generation of additional frequency signals for transmission over an auxiliary subchannel to minimize the error due to element prolongation in a subchannel responsive to the occurrence of consecutive element combinations requiring the transmission of consecutive frequency signals over the same primary subchannel including frequency generator means, signal detector means for providing a control signal indicating the occurrence of said consecutive element combinations, means for coupling said control signal to said frequency generator means to control the transmission of an auxiliary signal over said auxiliary subchannel, and means for simultaneously coupling said control signal to said signal generator means to block same from transmitting the frequency signal assigned to said combination over the normally assigned subchannel.

6. In a multiplex telegraph system in which the marking and spacing elements of messages which occur in each of a plurality of channels are modified for multiplex transmission, modulator means for providing a predetermined frequency output signal which represents the value of each combination of frequency signals input thereto, different output frequency signals being assigned to represent different combinations of frequency signals input thereto, different sets of said frequency signals being assigned for transmission over different subchannels; signal generator means including frequency generator means for each of said channels, each of which is operative to couple a frequency signal to said modulator means which is representative of the nature of the element in its associated channel, and auxiliary signal generator means including auxiliary frequency generator means coupled to the frequency generator means for at least one of said channels to control said modulator means to effect the transmission of an auxiliary frequency signal over an auxiliary subchannel in lieu of the assigned signal over the assigned subchannel, and means for enabling said auxiliary frequency generator means in response to the occurrence of consecutive combinations which require the transmission of consecutive frequency signals over the same subchannel, to thereby minimize the error due to element prolongation in the subchannels.

7. In a multiplex telegraph system in which the marking and spacing elements of messages which occur in each of a plurality of channels are modified for multiplex transmission, modulator means for providing a predetermined frequency output signal which represents the value of a plurality of signals input thereto, different output frequency signals being assigned to represent different combinations of frequency signals input thereto, different sets of said frequency signals being assigned for transmission over different subchannels; signal generator means including frequency generator means for each of said channels, certain of which include an electronic switching device operative to at least two conditions of operation, and enabling means for coupling the output of an individual frequency source to said modulator means responsive to operation of its associated switch to one of said predetermined conditions; and auxiliary signal generator means coupled to the frequency generator means for at least one of said channels to control said modulator means in the transmission of an auxiliary frequency over an auxiliary subchannel in lieu of the assigned signal over the assigned subchannel, and means for enabling said auxiliary signal generator means in response to the occurrence of consecutive combinations of elements in said channel which require the transmission of consecutive frequency signals over the same subchannel, to thereby minimize the error due to element prolongation in the subchannels.

8. A multiplex telegraph system as set forth in claim 7 in which said enabling means comprises a pair of diodes coupled between an individual frequency source and said modulator means, and a resistor coupled in the current-conducting circuit of said electronic switch and in parallel with said diodes, whereby the drop across said resistor with current flow over said electronic switch biases said diodes to conduct and to couple the frequency source to said modulator means.

9. A multiplex telegraph system as set forth in claim 7 which includes control means for interconnecting the output circuit of each electronic switch to the control circuit of each of the other electronic switches to effect the blocking of the other switches responsive to the operation of one switch.

10. In a multiplex telegraph system in which the marking and spacing elements of messages which occur in each of a plurality of channels are modified for multiplex transmission, and in which a predetermined frequency output signal is assigned to represent the value of a plurality of signals input thereto, different output frequency signals being assigned to represent different combinations of frequency signals input thereto, and different sets of said frequency signals being assigned for transmission over different subchannels; an output circuit, signal generator means including a frequency generator means for each channel, each of which includes switch means operative to couple a frequency signal to said output circuit which is representative of a particular species of said elements in its associated channel, auxiliary frequency generator means operative in response to the occurrence of consecutive combinations which require the transmission of consecutive frequency signals over the same one of said sub-channels to couple a preassigned frequency signal to said output circuit in lieu of one of the normally generated frequencies to thereby effect transmission of an auxiliary output frequency signal over an auxiliary channel in lieu of the assigned frequency signal over the assigned channel, and detector means connected to the frequency generator means for at least one of said channels operative responsive to the coupling of two consecutive channel elements to the same frequency generator means to couple a control signal to said auxiliary frequency generator means.

11. A multiplex telegraph system as set forth in claim 10 in which said frequency generator means for at least one channel each comprises an electronic switching device which is operative to a predetermined condition responsive to receipt of its preassigned element in its associated channel, and in which said detector means includes gate means connected between an input and output circuit of the switching device to be conductive responsive to the operation of the switching device to said predetermined condition, and means for coupling the output side of said gate means to said auxiliary frequency generator means, whereby a control signal is coupled to said auxiliary frequency generator means with the receipt of the second one of a pair of like elements.

12. A multiplex telegraph system as set forth in claim 10 in which said auxiliary frequency generator means includes an electronic switch including an output signal circuit for enabling an associated frequency source, and means for coupling the output signal circuit of said electronic switch to the switch means for the other channels to reset same responsive to each operation of the switch of said auxiliary frequency generator means, whereby a third element combination in a sequence in a subchannel effects operation of the system in the manner of the first combination of the sequence.

13. In a multiplex telegraph system in which the marking and spacing elements of messages which occur in each of a plurality of channels are modified for multiplex transmission, a predetermined frequency output signal being assigned to represent the value of a plurality of signals input thereto, different output frequency signals being assigned to represent different combinations of frequency signals input thereto, and different sets of said frequency signals being assigned for transmission over different subchannels; signal generator means including frequency generator means for each of said channels, each of which is operative to generate frequency signals which are respresentative of a particular species of the elements in its associated channel, auxiliary frequency generator means connected at least to one of said channels operative in response to the occurrence of consecutive combinations in said channels which require the transmission of consecutive frequency signals over the same subchannel to generate an auxiliary frequency for effecting transmission of an auxiliary output signal over an auxiliary subchannel in lieu of the assigned output signal over the assigned subchannel, and synchronization means for said frequency generator means including input means connected to said one channel, gate means for each frequency generator means connected to said input means for gating each of the channel elements to the preassigned one of said frequency generator means, and means for providing sync signals to said gate means to control the synchronized opening and closing of said gate means in the coupling of the channel signals to said frequency generator means.

14. In a multiplex telegraph system, in which a single frequency signal is transmitted to represent the marking and spacing elements which simultaneously occur in a plurality of a first set of channels, different frequency signals being assigned to represent different combinations of said marking and spacing elements, different sets of said frequency signals being assigned to different ones of a primary group of subchannels, and in which a predetermined different frequency is transmitted over an auxiliary subchannel in response to the occurrence of combinations which require the transmission of consecutive frequency signals over the same one of the primary subchannels to thereby minimize the error due to element prolongation in a subchannel, receiver means for receiving the signals transmitted over said subchannels, a plurality of filter and band limiter sets, each of which sets is coupled to said receiver means to pass the frequency signals of a preassigned subchannel, different sets being operative to pass the signals of different subchannels, a second set of channels equivalent in number to said first set of channels, switching means for each of said primary subchannel sets operative to generate signals representative of the marking and spacing element information indicated by the incoming signal for coupling to said second set of channels, and switching means connected to the filter and band limiter set for the auxiliary subchannel operative to generate element information for coupling to at least one of the second set of channels.

15. In a multiplex telegraph system as set forth in claim 14 in which the switching means for the auxiliary subchannel includes a first output circuit for coupling the generator marking and spacing element representative signals to one channel of the second set of channels, and a second output circuit for coupling the spacing element representative signals to associated equipment for the second one of the channels to indicate the receipt of an auxiliary signal.

16. In a multiplex telegraph system, in which single frequency signals represent the marking and spacing elements which simultaneously occur in two different channels, four frequency signals being assigned to represent the different combinations of said marking and spacing signals in said two channels, different sets of said frequency signals being assigned to two different primary subchannels, and in which two auxiliary frequency signals are alternately transmitted over an auxiliary subchannel in response to the occurrence of element combinations which require the transmission of consecutive frequency signals over the same subchannel to thereby minimize the error due to element prolongation in the subchannels, receiver means for receiving the different frequency signals transmitted over said primary and auxiliary subchannels, a plurality of filter and band limiter sets, each of which sets is coupled to said receiver means to pass a different pair of said frequency signals, a plurality of switching means, each of which is connected to a predetermined different one of said sets to provide signals representative of the pair of elements represented by the incoming signal; a second pair of channels, gating means for each of said channels, means for coupling each of the output signals of the switching means for the primary subchannels to the input means for both of the channels, and means for coupling the output signals of the auxiliary subchannel switching means to at least one of said channels.

References Cited in the file of this patent

UNITED STATES PATENTS 1,998,792 Sedmayer ------------- Apr. 23, 1935
2,805,278 Van Duuren ----------- Sept. 3, 1957